(12) United States Patent
Madigan

(10) Patent No.: US 9,115,845 B2
(45) Date of Patent: Aug. 25, 2015

(54) RAIL, ADHESIVE MOUNTED, TO DISPLAY UTENSILS AND OTHER OBJECTS

(76) Inventor: Stephen M. Madigan, Middletown, NJ (US)

(*) Notice: Subject to any disclaimer, the term of this patent is extended or adjusted under 35 U.S.C. 154(b) by 443 days.

(21) Appl. No.: 13/451,537

(22) Filed: Apr. 19, 2012

(65) Prior Publication Data

US 2013/0277525 A1 Oct. 24, 2013

(51) Int. Cl.
*F16M 13/02* (2006.01)
*A47F 5/08* (2006.01)
*A47J 45/02* (2006.01)

(52) U.S. Cl.
CPC .............. *F16M 13/02* (2013.01); *A47F 5/0838* (2013.01); *A47J 45/02* (2013.01)

(58) Field of Classification Search
USPC .............. 248/690, 691, 692, 214, 215, 205.1, 248/205.3, 302, 303, 304, 305, 225.21, 248/220.21, 220.22; 211/70.6, 106.01; 24/336, 457, 546, DIG. 10
See application file for complete search history.

(56) References Cited

U.S. PATENT DOCUMENTS

| | | | | |
|---|---|---|---|---|
| 1,814,303 A | * | 7/1931 | Finlay | 248/205.3 |
| 3,241,795 A | * | 3/1966 | Frye | 248/205.5 |
| 3,633,865 A | * | 1/1972 | Hogg | 248/467 |
| 4,106,741 A | * | 8/1978 | Hogg | 248/467 |
| 4,181,553 A | * | 1/1980 | Hogg | 156/211 |
| 4,317,555 A | * | 3/1982 | Hogg | 248/467 |
| 4,756,498 A | * | 7/1988 | Frye | 248/205.3 |
| 5,507,464 A | * | 4/1996 | Hamerski et al. | 248/683 |
| 6,402,113 B1 | * | 6/2002 | Chang | 248/340 |

* cited by examiner

*Primary Examiner* — Steven Marsh

(57) ABSTRACT

An esthetically pleasing article support in long thin rail form (11) is described. This rail is mated to double stick foam tape (12), the remaining face of that tape is affixed to a support structure (wall, under-shelf, door) (FIG. 1, FIG. 9). A double ended hook (15, 17, 30) linked to the rail through a pierced tab (24', 27') formed in the rail (23, 26) or coupled to the rail through a hasp (14,17, 20') supports the article. When hasps engage the tape unwelcome hook motion is blocked. The double ended hook may be moved to alternate positions on the rail without use of additional equipment, without disturbing adhesive bonds and without disturbing other utensils. Use of a thin rail conserves material and permits effective application of pressure to the tape-structure interface to insure bonding and permits delivery of a rail-tape-protective liner assembly in space saving coiled form.

3 Claims, 5 Drawing Sheets

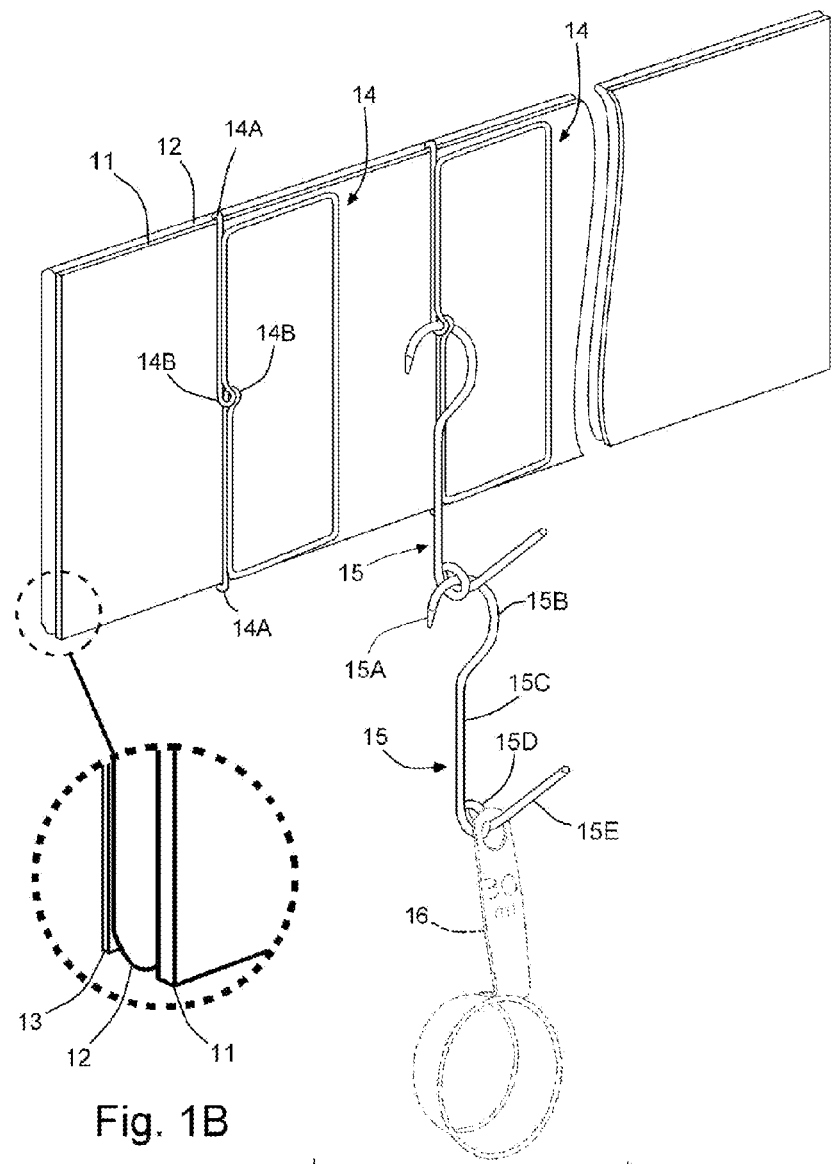
Fig. 1A
Fig. 1B
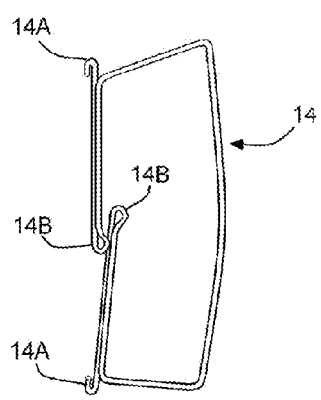
Fig. 2
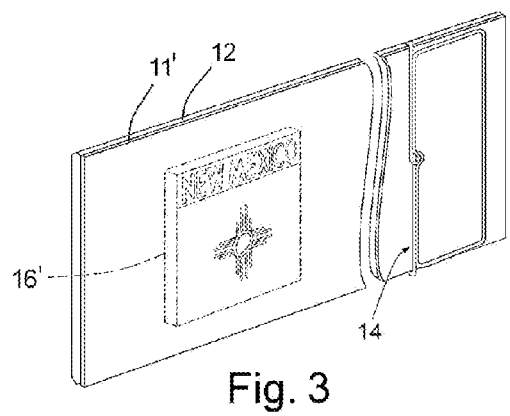
Fig. 3

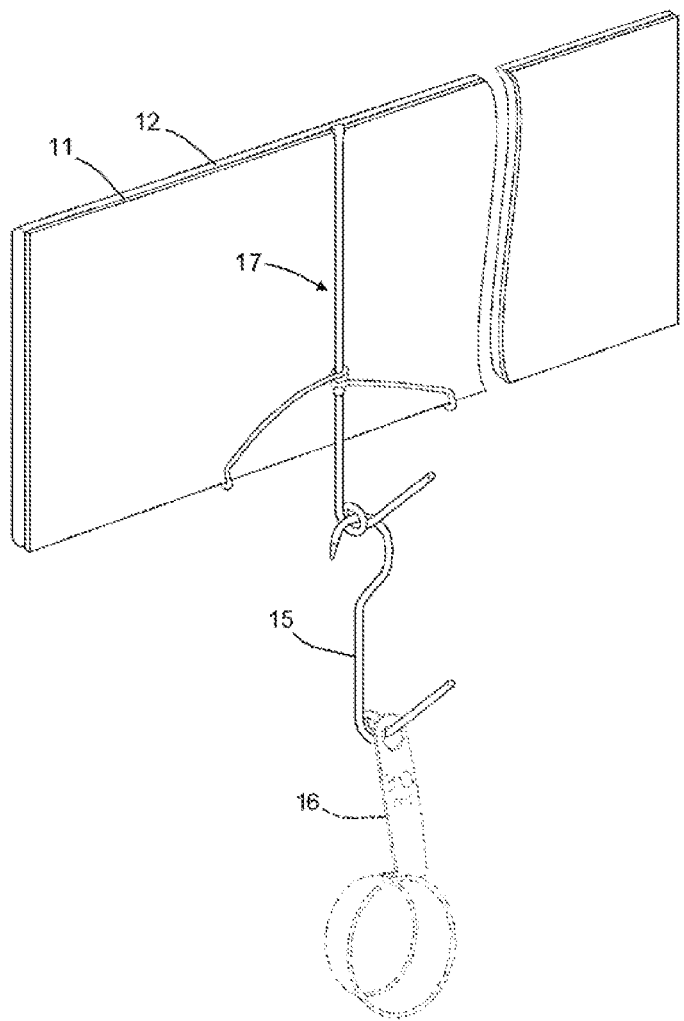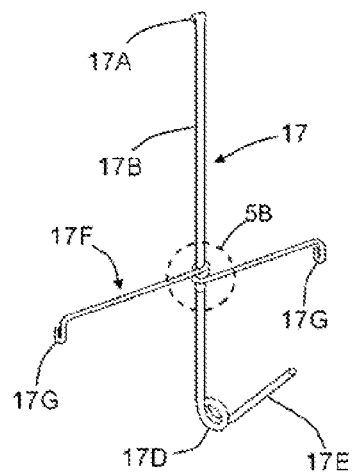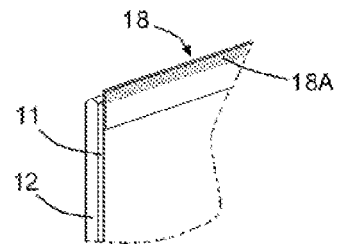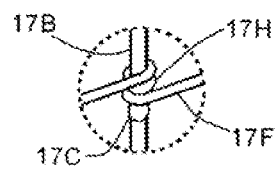

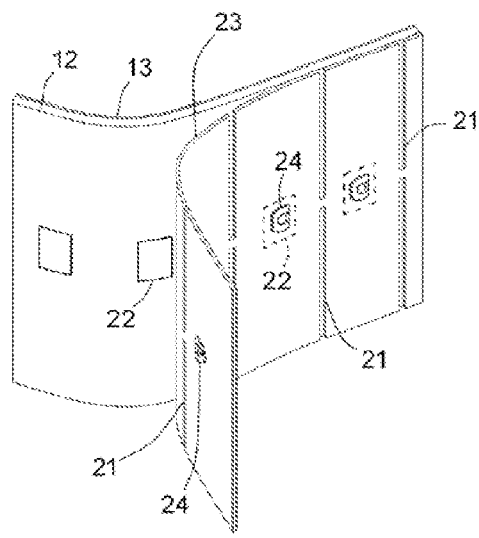
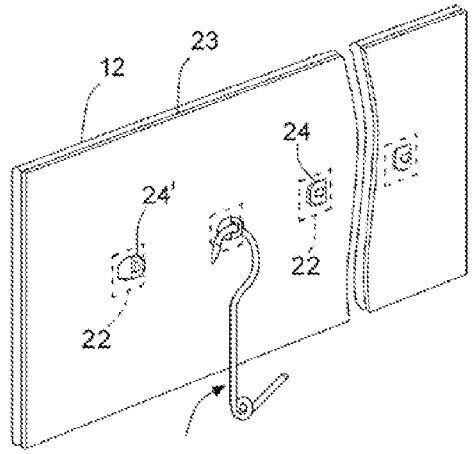
Fig. 8A
Fig. 8B
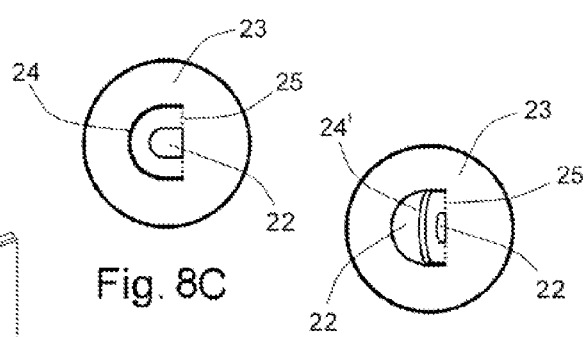
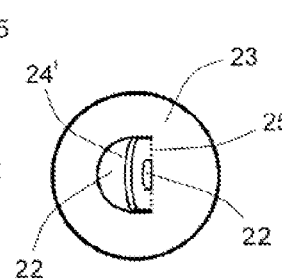
Fig. 8C
Fig. 8D
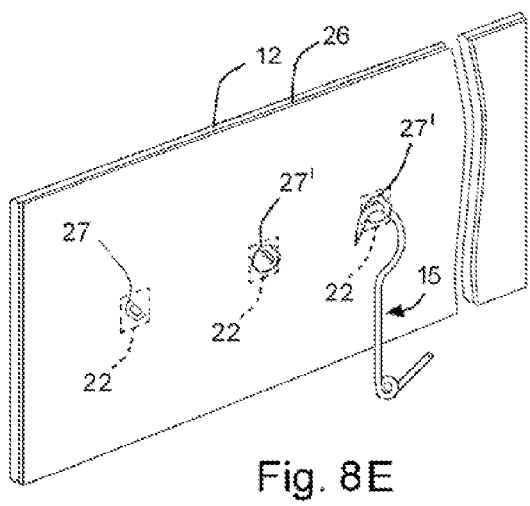
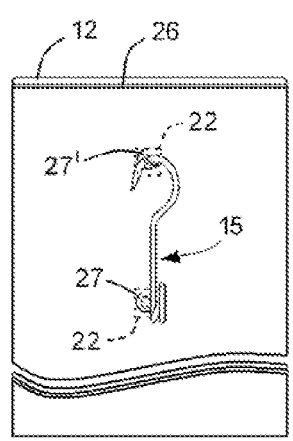
Fig. 8E
Fig. 8F
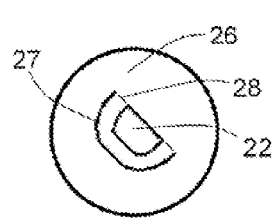
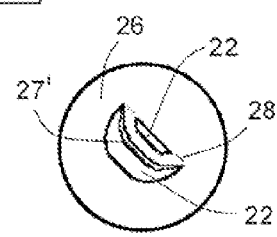
Fig. 8G
Fig. 8H

RAIL, ADHESIVE MOUNTED, TO DISPLAY UTENSILS AND OTHER OBJECTS

BACKGROUND

This application relates to article support in kitchens, offices and classrooms.

BACKGROUND, PRIOR ART

Many systems are available for the support of articles from a structure. All in extensive use provide satisfactory support as long as the user remains satisfied with the original location. Arakagawa (U.S. Pat. No. 4,736,855) provides a rail and wire rope system particularly useful for display of art objects but the rail requires the use of fasteners whose use on some structures is difficult. When screws are used the holes remaining in the structure after rails are removed, require repair.

Hamerski et al (U.S. Pat. No. 5,507,464), by use of a stretch release adhesive, provide a satisfactory solution to the problem of support structure damage after hook relocation. Their hook can be removed without damage to the structure however the adhesive strip is damaged by removal therefore a new adhesive strip suitable for the particular hook device employed must be available for the new hook location.

Liu (U.S. Pat. No. 5,429,252), offers an extruded slotted rail with various attachments that requires wall penetrating fasteners and permits relocation of hooks without tools. His system requires the use of a substantial amount of material.

The rail-adhesive system described herein overcomes these problems as will be seen in the following presentation.

SUMMERY

An article support in long thin rail form is described. This thin rail is mated to an adhesive ribbon, the remaining face of that ribbon is adhered to a support structure (wall, undershelf, door). Connecting means to supported articles include: pierced tabs formed from the thin rail, spring or sheet hasps, linkable double ended hooks of various configurations, and magnetic attraction. These items are arranged so that the connecting means may be moved to alternate positions on the rail without the use of additional devices and without disturbing adhesive bonds. Use of a thin rail permits the effective application of pressure to the ribbon-structure interface to insure bonding, reduces material requirements and permits delivery of a rail-ribbon-protective liner assembly in coiled form, reducing packaging, storage and shipping cost.

BRIEF DESCRIPTION OF THE DRAWINGS

FIG. 1A A perspective view of a rail-adhesive, spring hasp, double ended hook and suspended utensil assembly, wall mounted horizontally.

FIG. 1B Detail of a rail-adhesive protective liner assembly.

FIG. 2 A perspective view of a relaxed, detached spring hasp.

FIG. 3 A perspective view of a magnetic material rail-adhesive, spring hasp, double ended hook and suspended utensil assembly, wall mounted horizontally.

FIG. 4 A perspective view of a rail-adhesive, spring wire and double-ended hook and suspended utensil assembly, wall mounted horizontally.

FIG. 5A A perspective view of the of a spring wire and double-ended hook assembly, before installation on a rail.

FIG. 5B Detail of the junction of the spring wire and the shank of the spring wire and double-ended hook assembly.

FIG. 6 A perspective view of the of a spacer strip affixed to a rail-adhesive ribbon assembly.

FIG. 8A A perspective view of a pierced rail-adhesive assembly having 90 degree tabs, flexibility slits, backer patches and protective liner, partially assembled.

FIG. 8B A perspective view of a pierced rail adhesive assembly having 90 degree tabs, without flexibility slits, wall mounted with double ended hook installed.

FIG. 8C . . . A view perpendicular to the visible major surface of rail 23 focused on 90 degree tab 24.

FIG. 8D A view perpendicular to the visible major surface of rail 23 focused on 90 degree tab 24'

FIG. 8E A perspective view of the of a pierced rail adhesive assembly having 45 degree tabs wall mounted horizontally with a double ended hook installed.

FIG. 8F A perspective view of the of a pierced rail adhesive assembly having 45 degree tabs shown wall mounted vertically with a double ended hook installed.

FIG. 8G A view perpendicular to the visible major surface of rail 26 focused on 45 degree tab 27

FIG. 8H A view perpendicular to the visible major surface of rail 23 focused on 45 degree tab 27'

DRAWING REFERENCE NUMBERS

Figure 7A:
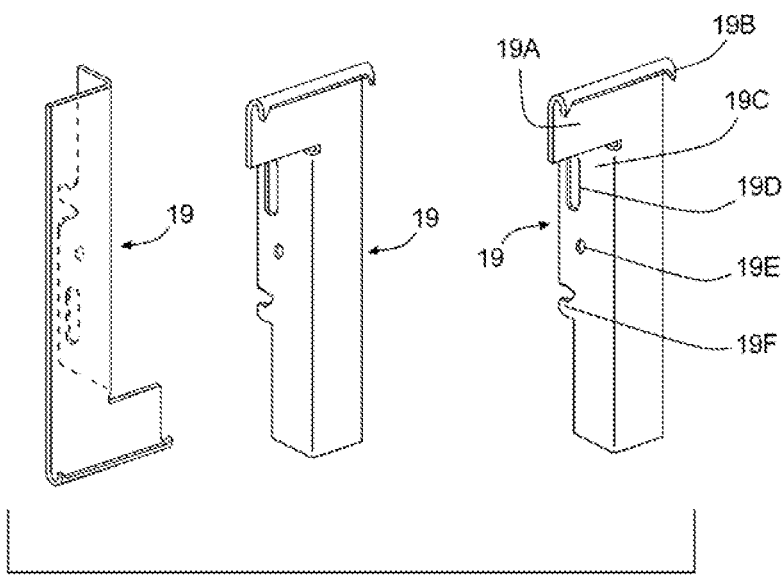
FIG. 7A A perspective view of a half sheet hasp shown in two positions.
Figure 7B:
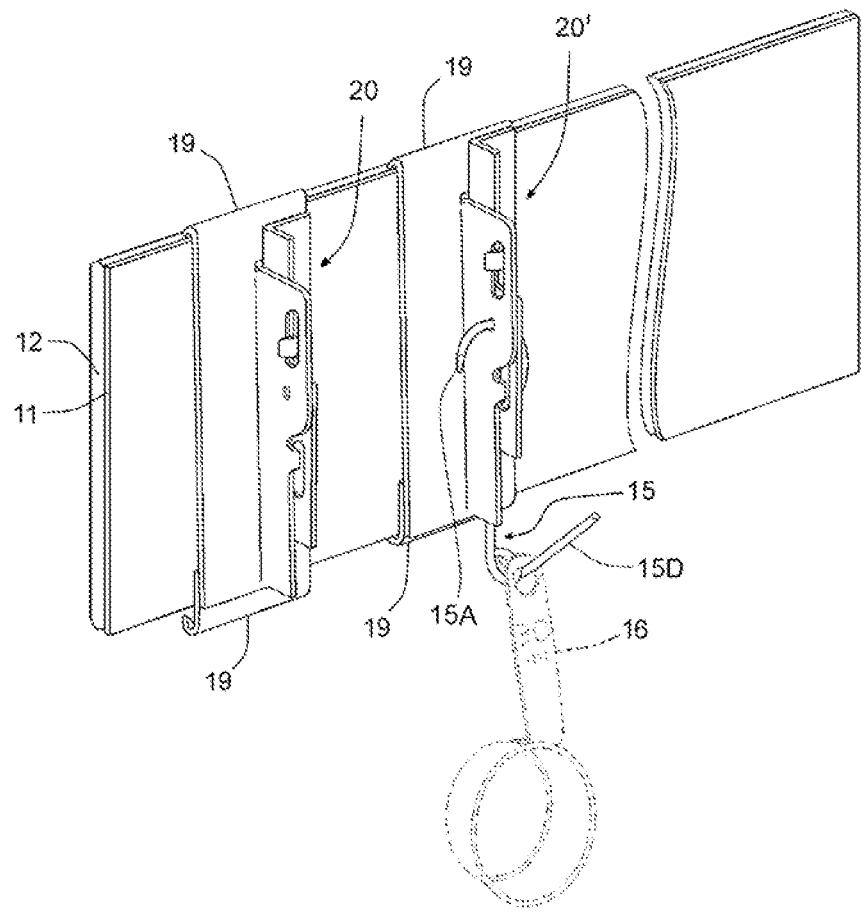
FIG. 7B A perspective view of two assembled sheet hasps, one shown in in open and one shown in dosed position shown on a horizontally mounted rail-adhesive strip with a double ended hook and a utensil installed on the sheet hasp shown in dosed position.
Figure 9:
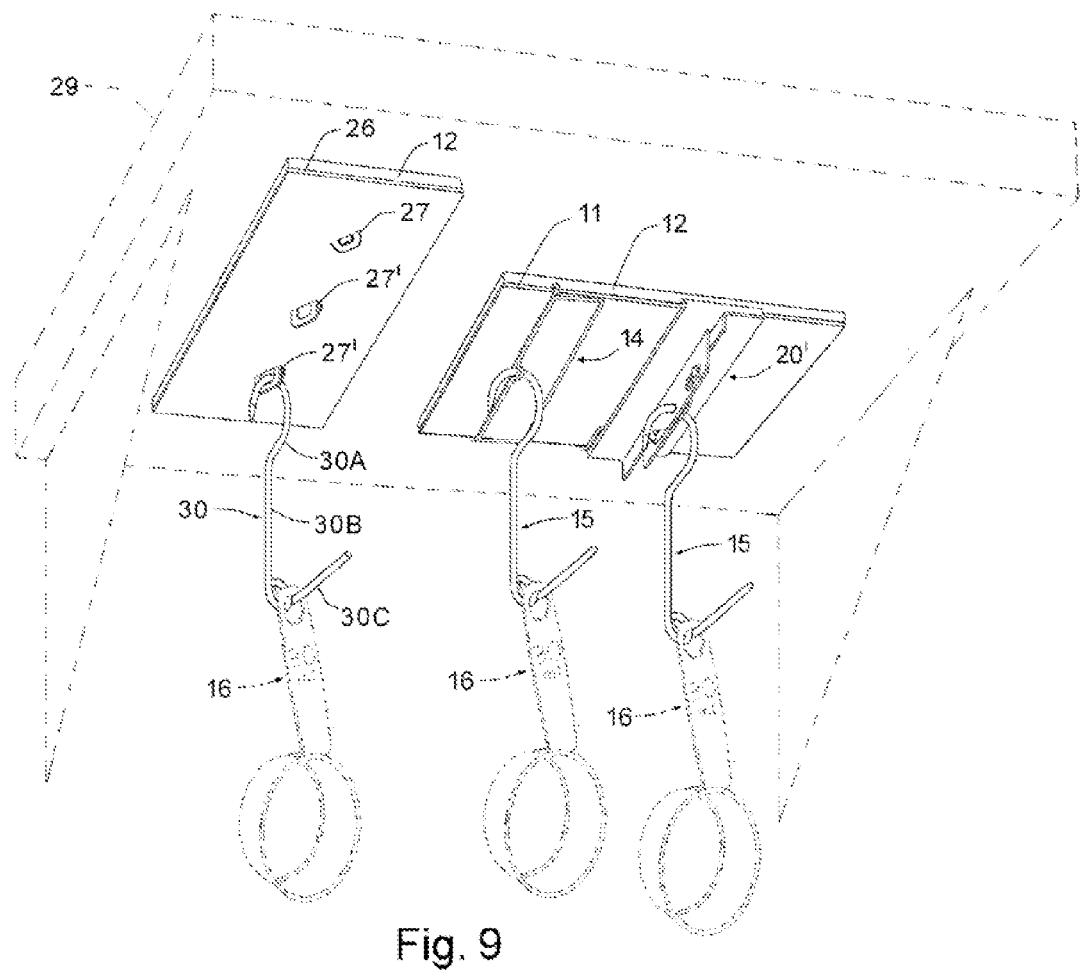
FIG. 9 A perspective view of two adhesive mounted rails, under shelf mounted. with double ended hooks and kitchen utensils suspended.

11 Thin rail without tabs.
11' Thin rail of magnetic alloy having disoriented domains, without tabs
12 Adhesive ribbon, full with.
13 Protective liner
14 Spring hasp
14A Spring hasp hook
14B Spring hasp port
15 Double ended hook (DEH), 90 degree twist.
15A DEH 90 degree twist, tapered end.
15B DEH 90 degree twist, upper hook.
15C DEH 90 degree twist, shank.
15D DEH 90 degree twist, port.
15E DEH 90 degree twist, lower hook.
16 Displayed kitchen utensil
16' Displayed refrigerator magnet.
17 Spring-wire double ended hook assembly (SWDEHA).
17A SWDEHA Upper hook.
17B SWDEHA Shank.
17C SWDEHA Distorted portion of shank.
17D SWDEHA Port.
17E SWDEHA Lower hook.
17F SWDEHA Horizontal spring member.
17G SWDEHA Spring wire hook.
17H SWDEHA Spring wire wrap.
18 Spacer strip.
18A Spacer strip overhang.
19 Half sheet hasp (HSH).
19A HSH "L" body.

19B HSH Claw.
19C HSH Long tab.
19D HSH Slot.
19E HSH Hook port.
19F HSH Small tab.
20 Sheet hasp, open position.
20' Sheet hasp, closed position.
21 Flexibility slit
22 Backer patch.
23 Pierced rail with 90 degree angle tabs.
24 Pierced tab, 90 degree angle, as formed.
24' Pierced tab, 90 degree angle erected for hook insertion.
25 Bend line of pierced tab, 45 degree angle.
26 Pierced rail with 45 degree angle tabs
27 Pierced tab, 45 degree angle, as formed
27' Pierced tab, 45 degree angle, raised for hook insertion.
28 Bend line of pierced tab, 45 degree angle
29 Wall mounted shelf assembly
30 Double ended hook (DEH), 45 degree twist
30A DEH, 45 degree twist, upper hook
30B DEH, 45 degree twist, shank
30C DEH, 45 degree twist, lower hook
31 Glass pane
32 Adhesive ribbon, narrow
33 Nail acting as travel stop for sheet hasp 20'

DETAILED DESCRIPTION FIG. 1A, 1B AND 2 OF THE FIRST EMBODIMENT

Referring to the figures, the display apparatus, which improves over the previous-encountered problems, comprises a thin dense rail 11 whose thickness is constant and whose edges and faces are parallel and is of indefinite length. Rail 11 is cut from aluminum flashing-68306 produced by Amerimax Home Products, 450 Richardson Drive, Lancaster, Pa. 17603. Other aluminum alloys, other metals such as steel and its alloys, in various tempers and surface finishes suitable to the application and high modulus of elasticity plastics, opaque, translucent and transparent, such as Polyamides (PA) Acrylonitrile butadiene styrene (ABS) with various coloring additives and surface finishes and thin Phenolic (PF) impregnated paper strips may be used. Thin dense rail 11' is similar to thin dense rail 11 except that it is composed of magnetic alloy having randomly oriented magnetic domains, providing support for magneticly supported articles. These magnetic alloys can be carbon steel or 403 stainless steel or other magnetic alloys. Said rail 11, 11' is affixed to a thick adhesive strip 12 of similar with and length and of constant thickness with the opposing face of adhesive strip 12 being affixed to a protective liner 13 which protective liner 13 is removed before adhering adhesive strip 12 to a mounting surface. Adhesive strip 12 and protective liner 13 are available as double coated permanent mounting tape 3M catalog #112 L 25.4 mm×3.17 m. Other 3M tapes and double adhesive face tapes by other manufacturers may be used. A rail gripping spring hasp 14 is affixed to rail 11,11' with spring hasp hooks 14A,14A to the upper and lower edges of rail 11, 11'. When installed on rail 11,11' spring hasp ports 14B, 14B align to support double ended hook 15. The lower, blunt end 15E of hook 15 provides support for displayed item 16. Material used for hasp 14 is steel music wire, 0.787 mm diameter. Other wire diameters and other materials such as other steel alloys and tempers as well as beryllium copper may be used. Different surface finishes suitable to customer preference may be used. The plane determined by shank 15C and upper hook 15B lies at approximately 90 degrees to the plane defined by lower hook 15E and shank 15C. Port 15D of double ended hook 15 provides support for more than one article for each installed spring hasp 14. The coated carbon steel wire used to form hook 15 is of circular cross section, approximately 2 mm diameter and of grade and temper used in the fabrication of wire coat hangers. Other wire shapes and other materials including metals and plastics may be used for hook fabrication. FIG. 1B shows protective liner 13 affixed to adhesive strip 12. Protective liner 13 is detached from adhesive strip 12 during installation of the rail-adhesive assembly 11, 11', 12 to a structure. FIG. 2 portrays spring hasp 14 in relaxed state before installation. Antiseptic coatings such as nano-silver particles or other bactericidal treatments may be applied to the rail and other system components to minimize microbial contamination.

OPERATION OF THE FIRST EMBODIMENT

For horizontally oriented rail-adhesive installation, prepare the wall surface to which the rail-adhesive assembly 11,11', 12 is to be mounted by cleaning with a 50:50 mixture of isopropyl alcohol (IPA) and water. Porous surfaces such as wood and concrete need to be sealed. Remove protective liner 13 while pressing adhesive strip-rail assembly 11,11' 12 to the Structure surface allowing sufficient clearance between rail 12 and any obstruction for installation of spring hasp hasp 14. Force adhesive into wall contact with a commonly available wall paper seam roller. Affix spring hasp 14 to each desired location along the lower and upper edges of rail 11,11'. Insert tapered end 15A of hook 15 into spring hasp ports 14B, 14B. Mount kitchen utensil 16 to lower hook 15E of hook 15.

This embodiment appears now to be the most cost effective in terms of capital investment for production.

DETAILED DESCRIPTION FIG. 4, 5A, 5B OF THE SECOND EMBODIMENT

As disclosed in FIG. 4 spring-wire and double-ended hook assembly 17 serves to link horizontally mounted rail-adhesive assembly 11, 11', 12 to displayed item 16. The upper hook 17A of spring-wire and double-ended hook assembly 17 is furnished flattened and bent to a shape that engages the upper edge of rail 11, 11' and penetrates adhesive strip 12. Horizontal spring member 17F of spring-wire and double-ended hook assembly 17 is positioned on vertical shank 17B of spring-wire and double-ended hook assembly 17 by the interaction of distorted portion 17C of shank 17B and spring wire wrap 1711. Wire hooks 17G, 17G engage the lower edge of rail 11,11' and penetrate adhesive 12. FIG. 5B shows detail of wire wrap 17H and the distorted portion 17C of shank 17B. FIG. 5A shows the spring-wire and double-ended hook assembly with its horizontal spring member 17F in relaxed state. Material used for horizontal spring member 17F is the same as that used for spring hasp 14. Material used for the remainder of assembly 17 is the same as that used for hook 15.

OPERATION OF THE SECOND EMBODIMENT

For horizontally oriented wall mounted rails engage upper hook 17A with the upper edge of rail-adhesive assembly 11, 11', 12 at the desired location. While orienting shank 17B in the preferred direction engage one of the two spring wire hooks 17G with the lower edge of rail-adhesive assembly 11, 11', 12. While maintaining the preferred orientation of shank 17B engage the other spring wire spreader hook, 17G with the lower edge of rail-adhesive assembly 11, 11' 12. Suspend the item to be displayed using lower hook 17E.

FIG. 6 shows spacer strip 18 which may be furnished adhesively assembled to rail 11, 11'. Overhang 18A provides a guide for installation of rail-adhesive assembly 11, 11', 12 when rail-adhesive assembly 11, 11',12 is to be mounted close to an obstruction. Overhang 18A provides enough room between the edge of rail 11, 11, and the obstruction for the installation of hasps 14 and 20' or spreader hook assembly 17. Spacer strip 18 is removed after installation of rail-adhesive assembly 11, 11', 12 to a structure.

This embodiment appears now to offer the greatest appeal to those interested in maximum hook stability

DETAILED DESCRIPTION FIG. 7A, 7B OF THE THIRD EMBODIMENT

FIG. 6A shows a high modulus of elasticity half sheet hasp 19 with the narrower portion of its V section 19A bent over in a claw shape 19B so as to engage rail 11, 11' with the tips of the claw penetrating adhesive strip 12. Half sheet hasp 19 is cut from the same material as used for rail 11, 11'. A large tab 19C set at right angles to the long shaft of the 'L' section 19A includes slot 19D, hook port 19E and short tab 19F. The locations of slot 19D and short tab 19F are such that they mutually engage when two half sheet hasps are mated, shown as sheet hasp in open position 20. Hook port 19E is formed to be loose fit to the upper hook 15B of hook 15. Said hook port is located such that when the mated half sheet hasps 19,19 are in the dosed position 20' the hook ports 19E,19E in each half sheet 19 align to form a port for the upper hook 15B of hook 15.

OPERATION OF THE THIRD EMBODIMENT

For horizontally mounted rail assemblies 11, 11' 12, assemble two half sheet hasps 19, 19 shown as sheet hasp 20. Engage one claw 19B to one edge of rail 11, 11' at the desired location. Holding the mated sheet halves against the face of rail 11, 11' slide the sheet halves 19, 19 to the dosed position shown as 20'. Insert the tapered end 15A of hook 15 into the aligned ports 19E, 19E. Suspend the desired the item for display from the lower hook 15E of double ended hook 15. The relocation of sheet hasp 20' to another place along rail 11, 11' is accomplished by removing hook 15 from sheet hasp 20', sliding the sheet hasp 20' to the open condition 20 and relocating sheet hasp 20 to the desired new location.

This embodiment appears now to be the most appealing to those interested in an attractive installation.

DETAILED DESCRIPTION FIG. 8A, 8B, 8C 8D OF THE FOURTH EMBODIMENT

FIG. 7A shows a pierced rail 23 similar to rail 11, 11' but with a series of pierced tabs 24 located approximately midway between the long edges of rail 23. The bend line 25 of tab 24 forms a right angle with the long edges of rail 23. The opening in pierced tab 24 is a loose fit to the upper hook 15B of hook 15. Backer patch 22 is affixed to adhesive strip 12 prior to the mating of rail 23 to adhesive strip 12. Backer patch material is cut from Brushed Aluminum SS Vinyl Tape, 1 inch×25 feet (120425742244), available from: Paper Street Plastics, 115 W 2nd St, Howell, N.J. 07731-8514, USA. Other thin materials of metal, plastic or a combination of metal and plastic may be used, with or without adhesive. The location of backer patch 22 on adhesive strip 12 is such that backer patch 22 is centered on pierced tab 24. Backer patch 22 is affixed to adhesive strip 12 with its adhesive face toward adhesive ribbon 12. Backer patch 22 is provided to protect adhesive ribbon 12 from penetration by tapered tip 15A, and upper hook 15B and to avoid adhesive attachment of pierced tab 24 to adhesive ribbon 12

OPERATION OF THE FOURTH EMBODIMENT

After fastening thin rail-adhesive ribbon assembly 23 12, to a support structure in a horizontal orientation, insert hook 15 in pierced tab 24 using the tip of the tapered end 15A of hook 15 to raise pierced tab 24 to a position perpendicular to the face of pierced rail 23. Item 24' shows pierced tab 24 after having been raised to a position perpendicular to the face of pierced rail 23. Then engage the upper hook 15B of hook 15 through pierced tab 24'. The assembled protective liner. 13, adhesive strip 12, backer patch 22 and pierced rail 23 are shipped in coiled condition to the installer with the pierced tab in position shown as 24, allowing tighter coiling of the aforementioned assembly.

This embodiment appears now to be the most cost effective in terms cost of materials and parts simplicity. Flexibility slits, when provided, serve to accommodate structure surfaces that deviate significantly from a flat or cylindrical shape.

DETAILED DESCRIPTION FIG. 8E, 8F, 8G, 8H OF THE FIFTH EMBODIMENT

The pierced tabs shown in FIGS. 8E and 8F are similar to those described in the fourth embodiment except that the bend line 28 of tab 27 forms a 45 degree angle with the long edges of rail 26. The opening in pierced tab 27 is a loose fit to upper hook 15B. Backer patch 22 is affixed to adhesive strip 12, adhesive face to adhesive face, prior to the mating of rail 26 to adhesive strip 12. The location of backer patch 22 on adhesive strip 12 is such that backer patch 22 is centered on pierced tab 27.

OPERATION OF THE FIFTH EMBODIMENT

For wall installed adhesive-rail assemblies, insert the tapered end 15A of hook 15 in pierced tab 27 using the tip of the tapered end 15A of hook 15 to raise pierced tab 27 to a position shown as pierced tab 27', perpendicular to the face of pierced rail 26. Then engage the upper hook 15B of hook 15 through pierced tab 2T. When adhesive-rail assembly 12-26 is installed in an under-shelf location as illustrated in FIG. 8, double ended hook 30 can be used. Double ended hook 30 is similar to double ended hook 15 except that the plane defined by the shank 30B of double ended hook 30 and its upper hook 30A forms a plane at a 45 degree angle with the plane defined by the shank 30B of double-ended hook 30 and its lower hook 30C. Lower hooks 15D, 30C serve to support the displayed item.

This embodiment appears now to be the most flexible as it includes installation in both horizontal, vertical and vertical and diagonal orientation using two hook types.

DETAILED DESCRIPTION FIG. 10 OF THE SIXTH EMBODIMENT

Figure 10:
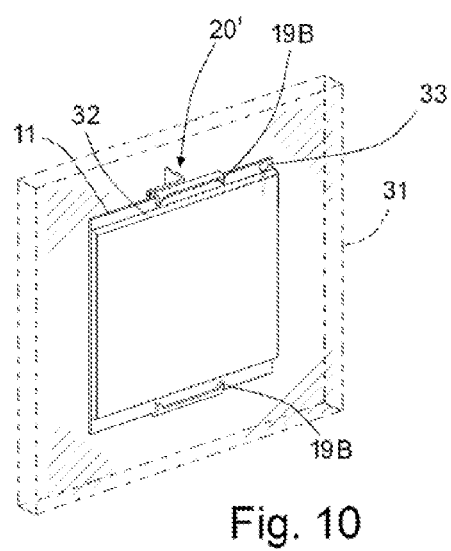
FIG. 10 A perspective view through a glass pane of a slidably mounted sheet hasp assembly in the dosed position showing a narrow adhesive strip and travel stop.

As shown in FIG. 10 as seen through glass pane 31, adhesive ribbon 32 is narrower than rail 11, 11' by an amount sufficient to avoid penetration of adhesive ribbon 31 by the claws 19B of closed sheet hasp 20', while closed sheet hasp 20' is mounted on rail 11, 11'. Nail 33 is inserted into adhesive ribbon 32 to serve as a stop, when required, to limit the motion of dosed sheet hasp 20'.

OPERATION OF THE SIXTH EMBODIMENT

Construct adhesive ribbon 32 such that it is narrower than rail 11, 11' by an amount slightly greater than twice the length of the claws 19B of half sheet hasp 19 when the claw length is measured along a line parallel to the grater faces of rail 11, 11' and perpendicular to the edges of rail 11, 11' while sheet hasp 21 is mounted on rail 11. Mate narrow adhesive ribbon 32 to rail 11 such that adhesive ribbon 32 is centered on rail 12. Assemble half sheet hasps 19 to for sheet hasp 20. holding sheet hasp 20 against the face of rail 11, slide sheet hasp 20 to the closed position 20'. A double ended hook and suspended article can be then added. This allows relocation of sheet hasp 20' to an alternate location along rail 12 without removing hook 15 as desired by the user.

This embodiment can employ a single adhesive faced ribbon with magnetic qualities whose magnetic domains are suitably oriented when the structure has appropriate magnetic properties and rail 11,11' is installed horizontally.

CONCLUSION, RAMIFICATION, SCOPE

A significant limitation in the use of adhesives for support of articles is the difficulty of insuring full adhesive contact with the support structure. Full adhesive contact between the adhesive ribbon and the rail can be insured during manufacture of the rail-adhesive-protective liner assembly. The use of a thin rail insures that the forces employed while installing the described thin rail-adhesive assembly to its support structure are effectively transmitted to the adhesive ribbon-support structure interface in order to insure full contact by virtue of the flexibility of the thin rail described. As an aid in understanding the dual nature with respect to rigidity and flexibility of the thin rail described herein, consider a food can whose top and bottom lids have been removed. Said open ended can will support considerably more weight when set in an upright position compared to the weight it will support when resting on its side. The rail-adhesive system described herein is flexible enough to easily transmit installation forces and can follow the contours of support structures but is rigid enough with respect to the load imposed by the described attachment means that it performs effectively.

An annoying characteristic of many rail-hook article support systems is the accidental displacement of the hook during installation or removal of the supported article. The system here described restrains motion of the upper hook of the double ended hook during installation and removal of the displayed item. Because the hasps and hook of the described system can be readily moved to a new location on said rail without disturbing the rail-adhesive system, the user can rearrange the location of displayed items without disturbing the adhesive. The nature of the adhesive-rail-protective liner system described herein is such that a long coil of assembled rail-adhesive-protective liner can be supplied to the installer who, with readily available cutting tools, can tailor short lengths to suit available mounting surfaces. FIG. 8F shows that this rail-adhesive system can be utilized when a vertically oriented rail is required. The ability to coil the described adhesive-rail-protective liner assembly reduces packaging dimensions compared to rigid rail systems providing economies of packaging, storage and shipping. The use of a thin rail offers economy of material.

Some display systems incorporate voids and channels in their structure. Voids and channels that provide refuge for vermin are minimized in this adhesive mounted thin rail system.

The preceding description of these embodiments are merely exemplary and are not intended to limit the scope in any way. Thus the scope of the embodiments should be determined by the appended claims and their legal equivalents, rather than the examples given.

I claim:

1. A device to suspend articles for display from a surface comprising:

a. a thin rail of high modulus of elasticity material said rail having rectangular section and indefinite length and a. a thin rail similar in shape to surveyor's tape said rail composed of high modulus of elasticity material said rail having rectangular section and six faces the least of said faces referred to as ends two of said faces greater in area than said ends described as edges the greatest of said faces described conventionally as faces one of which face may be finished to enhance its appearance the dimensions of said ends determined by the weight of said articles to be suspended and the properties of said high modulus of elasticity material said rail having length at least 2.1 times said end's major dimension said length determined by its intended use and b. a ribbon of material of low modulus of elasticity and strong adhesive properties on its faces having dimensions similar to said thin rail but of greater thickness with said ribbon matched and mated to one of the faces of said thin rail with said ribbon having its other face available to be affixed to a surface with the face area of said thin rail said ribbon commonly referred to as double stick foam tape said ribbon having sufficient adhesive strength to support said articles to be displayed and c. a protective liner affixed to the remaining face of said ribbon prior to said ribbon being mounted to said surface with the length of this combination of said rail said ribbon and said protective liner furnished straight in lengths up to about 1 meter or in coiled form in greater lengths permitting cutting of said rail-ribbon-liner assembly to a length suitable to its intended use said liner to be removed from said rail-ribbon before attachment of said ribbon of material to said surface and d. coupling means to link said articles at various and several locations along said rail.

2. A device to suspend articles of claim 1 wherein said rail is pierced and punched at periodic intervals along its length said piercing and punching serving to form D shaped tabs said tabs serving as multiple connecting means for said items to be displayed.

3. A device to suspend articles of claim 2 wherein said ribbon is provided with backer patches on said ribbon face adjacent to said thin rail aligned with said tabs said patches serving to facilitate raising said tabs said raised tabs providing coupling means to said articles.

* * * * *